United States Patent [19]
Luneau

[11] Patent Number: 5,526,406
[45] Date of Patent: Jun. 11, 1996

[54] CALLING PARTY ANNOUNCEMENT APPARATUS

[76] Inventor: David J. Luneau, 274 Gage Hill Rd., Hopkinton, N.H. 03229

[21] Appl. No.: 303,534

[22] Filed: Sep. 9, 1994

Related U.S. Application Data

[63] Continuation-in-part of Ser. No. 827,262, Jan. 29, 1992, abandoned.

[51] Int. Cl.[6] .................................................. H04M 11/00
[52] U.S. Cl. ............................... 379/61; 379/142; 379/67
[58] Field of Search ............................. 379/58, 61, 67, 379/88, 142, 214, 249, 374, 100, 127

[56] References Cited

U.S. PATENT DOCUMENTS

| | | | |
|---|---|---|---|
| 4,899,358 | 2/1990 | Blakley | 379/142 X |
| 4,914,716 | 4/1990 | Takahashi | 379/100 X |
| 4,924,496 | 5/1990 | Figa et al. | 379/142 |
| 5,054,055 | 10/1991 | Hanle et al. | 379/142 |

*Primary Examiner*—Curtis Kuntz
*Assistant Examiner*—G. J. Oehling
*Attorney, Agent, or Firm*—William B. Ritchie

[57] ABSTRACT

A calling party announcement apparatus that provides the identity of the caller in synthesized human speech. The invention captures the Incoming Caller Line Identification (ICLID) signal while the telephone is ringing. After the called party has answered the telephone, the invention announces the calling party's name or telephone number to the called party over the telephone receiver. The called party can elect to accept or reject the call before the telephone company central office has connected the two parties together. The invention makes it possible to screen incoming telephone calls without the aid of a special Caller ID telephone set or auxiliary Caller ID display terminal. The invention is installed in the customer premises, such as a residence or office, between the telephone line demarcation point and the telephone sets. The invention is compatible with any standard telephone set and subscriber trunks provisioned with the Caller ID enhanced customer feature. One of the most important features of the invention is its ability to deliver a vocalized announcement of the caller's identity over a standard telephone set's receiver without the call having actually been declared answered by the telephone company, and without the caller having been cut through. The call is not considered "answered" nor is it billed by the telephone company unless the called party or a telephone answering device, such as an answering machine, accepts the call.

19 Claims, 10 Drawing Sheets

CALLING PARTY ANNOUNCEMENT APPARATUS

This application is a Continuation-in-Part of U.S. patent application Ser. No. 07/827,262, filed Jan. 29, 1992, now abandoned.

BACKGROUND OF THE INVENTION

1. Field of the Invention

The invention relates to an apparatus that identifies incoming telephone calls and allows the called party to accept or reject the call before the telephone company has connected the two parties together.

2. Description of Related Art

Changes in the North American telephone network have opened the door to new services available to business and residential customers. In particular, CLASS (Caller ID, Return Call, Call Block, Repeat Call, Priority Call, and Select Forward) services have been made possible, in part, by the deployment of a common channel interoffice signaling system called SS7. This signaling system brings information about the call to points in the telephone network not previously available. For example, the identity of the calling party is made available, electronically, to the called party.

The Caller ID feature particularly promises a series of novel and useful benefits to the telephone subscriber. The telephone number of the calling party is made available such that it can be presented to the called party. Of particular note, especially in light of the ruling concerning information service offering by telephone companies, the data representing the calling party number is transmitted before the called party has answered, officially completing the connection. Because this is the case, the called party can use the information to make a decision whether of not to answer the telephone or how it is to be answered.

To date, the majority of subscriber owned and provided devices used to receive and interpret the data containing the calling party's number make use of some sort of visual display to convey the information to the user. Some devices do not display the data but make it available in a form which can be accepted by a personal computer.

In U.S. Pat. No. 4,582,956, issued Apr. 15, 1986 to Carolyn A. Doughty, a method is disclosed to display special information about a call, such as the calling party's telephone number. The method does not provide means for vocalized announcement of the number or association with any other information about the caller.

In U.S. Pat. No. 4,924,496, issued May 8, 1990 to Romek Figa, an incoming call number display is described that permits the called party to view the name or number of the caller. Although the invention provides means to associate the caller's number with a name, it does not provide means for vocalized announcement.

In U.S. Pat. No. 5,054,055, issued Oct. 1, 1991 to John P. Hanle, a system is disclosed to pass the calling party's number sent by the telephone office to a computer system. While common hardware and software components are available to announce the caller's identity, provision is not made for announcement over the answered telephone set, nor is it an object of such to implement a call announcement apparatus.

In U.S. Pat. No. 4,720,848, issued Jan. 19, 1988 to Tadahiko Akiyama, a system is disclosed to render information about an incoming call. While vocalized announcement is achieved over the telephone set, a special telephone office switch or private branch exchange (PBX) is necessary.

Similar implementations are cited in U.S. Pat. No. 4,899,358, issued Feb. 6, 1990, and U.S. Pat. No. 5,007,076, issued Apr. 9, 1991, both to James R. Blakely. Such implementations provide all vocalized announcement means via apparatus located at the telephone office switch or PBX, and are not designed as small business or residential premise equipment on trunks provisioned with the Caller ID enhanced service feature.

A variety of products are available that do not utilize the Caller ID enhanced service feature but instead screen incoming calls by querying the caller for a name or number after the telephone connection has been established. U.S. Pat. No. 4,304,968, issued Dec. 8, 1981 to Klausner et al, discloses such an apparatus that answers the incoming telephone call and directs the caller to enter his or her telephone number using the telephone set tone keypad. Next, the device performs a search through a database of callers before ringing the premise extensions and announcing the caller's name. Such a device not only requires cooperation from the calling party to enter the telephone number but may result in a billed toll call since the call has actually been answered.

The disclosed invention improves on the prior art by providing a single-line customer premise apparatus that transmits the name or number of the calling party audibly via the telephone itself. In contrast to existing devices which provide a visual display, the invention does not require the subscriber to be within viewing distance, nor does it require the subscriber to purchase and install units for each extension telephone. The invention can serve all telephones on the premises as well as being used with cordless telephones. The device is compatible with the "Caller ID" and "Caller ID with Call Waiting" enhanced service features available from a growing number of telcos.

SUMMARY OF THE INVENTION

It is an object of the invention to provide a calling party announcement apparatus that delivers the calling party's name or telephone number to the called party over the telephone set's receiver.

It is also an object of the invention to deliver the calling party's name or telephone number to the called party prior to the telephone company delivering the call.

It is another object of the invention to receive the Incoming Call Line Identification (ICLID) signal and announces the caller's telephone number based on the contents of such signal.

It is another object of the invention to receive the ICLID signal and announces the name of the caller based on a database reference to the caller's telephone number contained in such signal.

It is another object of the invention to deliver the calling party's name or telephone number to the called party on lines provisioned with Caller ID with Call Waiting.

It is another object of the invention to operate in a manner whereby the calling party is unaware that the apparatus is installed.

It is another object of the invention to provide audible Caller ID delivery over any or all telephone sets sharing the same telephone line.

It is another object of the invention to extend the Caller ID service to visually impaired subscribers.

It is another object of the invention to provide a calling party announcement apparatus that can be centrally located in the subscriber's premises.

It is another object of the invention to provide a calling party announcement apparatus that works with auto-answering devices such as answering machines, modems, and faxes.

It is another object of the invention to provide a calling party announcement apparatus that works with cordless telephone sets.

It is another object of the invention to provide a calling party announcement apparatus that is easy to install in a home or office with little knowledge of telephone wiring.

It is another object of the invention to provide a calling party announcement apparatus that will not interfere with outbound calling, emergency calls, call waiting, or other special telephone subscriber services.

It is another object of the invention to provide a calling party announcement apparatus that will block unwanted calls.

It is another object of the invention to provide a calling party announcement apparatus that displays the local date and time.

It is another object of the invention to provide a calling party announcement apparatus that displays the name and telephone number of incoming telephone calls.

It is another object of the invention to provide a calling party announcement apparatus that provides a log book of incoming calls.

It is another object of the invention to provide a calling party announcement apparatus that will not require special provisions at the telephone central office for name database access or announcement apparatus.

It is another object of the invention to provide a calling party announcement apparatus that is compatible with Bellcore specifications for data transmission used on Caller ID service and Caller ID with Call Waiting service.

It is a final object of the invention to provide a calling party announcement apparatus that allows the subscriber customize the announcement of the calling party's name.

The invention is a calling party announcement apparatus for a telephone system which provides audible identification of incoming calls to a subscriber's telephone set connected to said system. Detecting means, connected between said system and said telephone set, is provided for detecting the caller's identification signal. Central processing means for processing said line identification signal outputs a signal corresponding to the identity of the caller is provided. Isolation means for isolating an engaged telephone set from the telephone company central office switch is provided. Loop current means for establishing a telephone current loop condition to power the isolated telephone set is also provided. Announcing means for transforming the identity signal provided by said central processing means produces an audible signal that announces the caller's identity over the engaged telephone set.

DETAILED DESCRIPTION OF THE INVENTION

Figure 1:
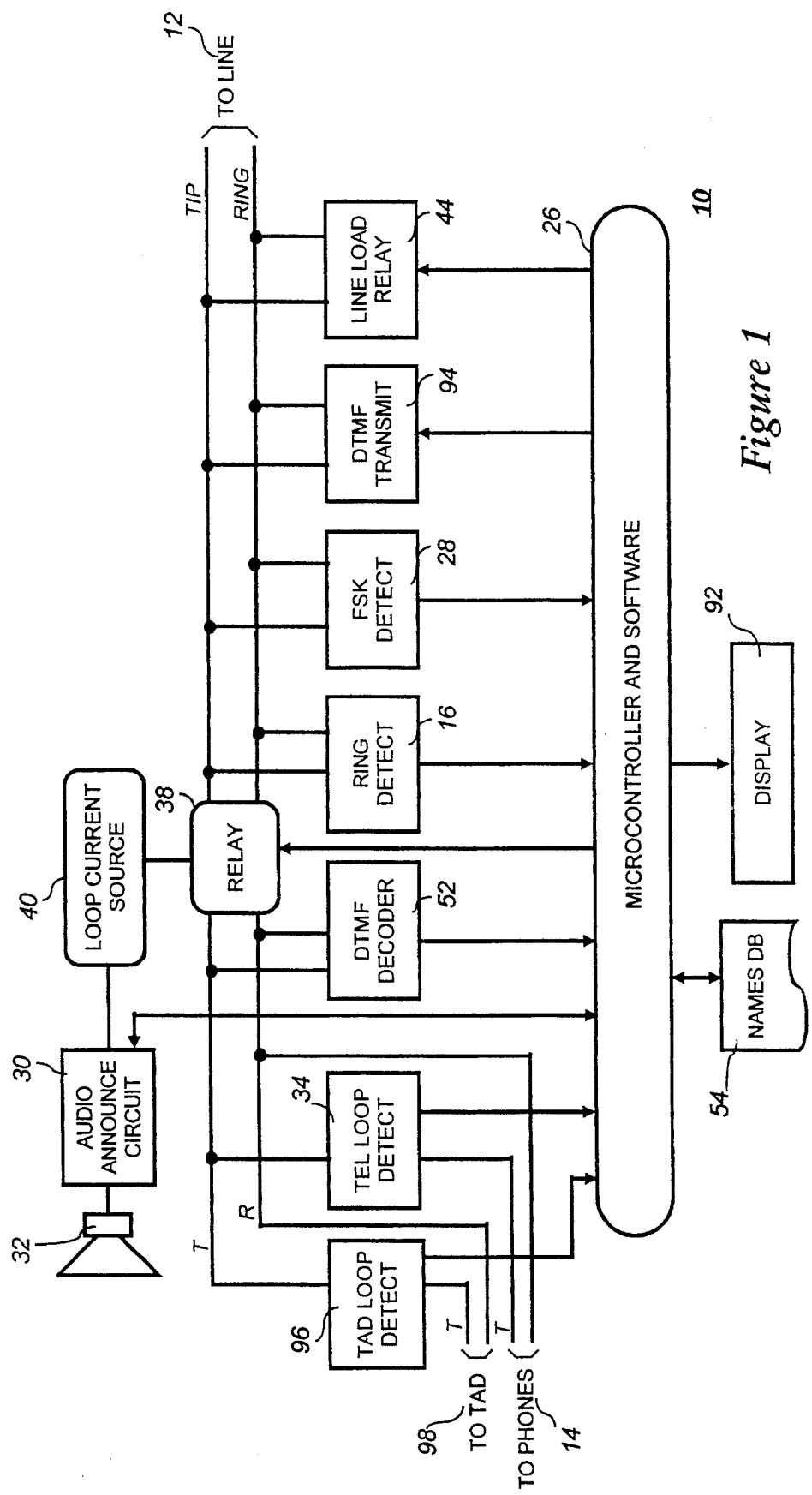
FIG. 1 illustrates a block diagram of the system including all functional components in accordance with the invention.

The invention makes it possible to screen incoming telephone calls. The invention is an improvement over Caller ID-equipped telephone sets, Caller ID display terminals, and telephone-company based call screening subscription services. The invention is installed in the customer premises, such as a residence or office, between the telephone service demarcation point and the telephone sets. The invention is compatible with standard telephone sets. The invention is also compatible with standard analog telephone subscriber trunks. The invention is also compatible with standard Incoming Caller Line Identification "ICLID", which is commonly known as Caller ID. Caller ID is an enhanced subscriber service offered by local telephone companies for a nominal monthly charge.

For an incoming call, the invention captures the ICLID signal during the quiet period following the first ring. The caller's name or telephone number is announced right away over a built-in speaker, identifying the caller prior to answering a telephone.

After the telephone is answered, the invention announces the caller's name or telephone number over the telephone receiver by way of a locally generated current source.

The telephone company central office is unaware that the telephone was answered and continues to return the ringback indication to the calling party and ring voltage to the subscriber's service demarcation point.

The called party can elect to accept the call by flashing the telephone's hook switch or touching a specific key on the telephone keypad. Once the call is accepted, the caller and called parties are connected and normal telephone operation is restored.

The called party can reject the incoming call by hanging up the telephone. If the call is rejected, and the caller continues to wait for an answer, ringing is restored, but the Caller ID is not announced again. This provides an opportunity for telephone answering devices to accept the call. It also gives the called party another chance to accept the call.

The invention supports identification of incoming calls that arrive while the subscriber's telephone set is engaged with another call. Many telephone users subscriber to a service called "Call Waiting" for handling incoming telephone calls while the subscriber's telephone set is busy or engaged. On telephone lines provisioned with "Caller ID with Call Waiting" service, the invention detects the Caller ID information following the Call Waiting indication, and identifies the caller's name or telephone number of the waiting call at the subscriber's convenience, by announcing the waiting caller's name or telephone number over the engaged telephone's handset. Only the called party hears the announcement.

The invention decodes the Caller-ID information according to Bellcore technical documents for Calling Party Name and Number Delivery, and Calling Party Name and Number Delivery with Call Waiting.

No special provisions are necessary at the telephone company central office switching system other than for Bellcore-standard Caller-ID which is now available in generic software packages from all major switching system manufacturers.

The most significant technical aspect of the invention is its ability to deliver an audible announcement of the caller's identity over a standard telephone set's receiver without the call being delivered by the telephone company. The call is not considered "answered" nor is it billed by the telephone company until the called party or an telephone answering device, such as an answering machine, accepts the call.

Preventing the telephone company central office from detecting the off-hook condition is achieved by isolating the telephone sets from the telephone company central office at precisely the moment the telephone set is engaged. In the preferred embodiment, this is done by energizing a relay that breaks the connection to the central office after the telephone is answered but before the central office has detected the off-hook condition. In another embodiment, this invention can take advantage of common provisions, such as the radio frequency (RF) interface in cordless telephones, that physically isolate the remote handset from the telephone network not otherwise intended for purposes of audible off-hook Caller-ID delivery.

While the off-hook telephone is isolated from the telephone company central office, the telephone is connected to a loop current supply internal to the invention. The loop current supply is necessary to power the off-hook telephone set while providing the audible announcement over the receiver.

Recent advances in speech storage and compression techniques make it possible to integrate "off-the-shelf" speech devices to provide the audible announcement of the caller's identity. It is not the object of the invention to promote a special speech technology, but rather to be able to take advantage of such generic technology as it becomes available.

The power ringing signal is provided directly by the telephone company central office. The invention does not block or regenerate the ring signal. This attribute is particularly important for subscribers of other custom calling services, such as "distinctive ringing". The invention's means for detecting a telephone off-hook condition and isolating the telephone from the telephone company central office is designed specifically so as not to interfere with ringing.

FIG. 1 illustrates a block diagram of the system including all functional components in accordance with the invention. Invention 10 is connected to the telephone network at connection point 12, typically an RJ-11 "modular" telephone jack common to most telephones. All telephone sets served by the invention are connected at point 14, also typically an RJ-11 jack. A dedicated telephone jack 98, also typically an RJ-11 jack, is provided for telephone answering devices. While in the idle or power-down state, double pole double throw relay 38 is in the position that connects the Tip and Ring leads at point 12 to the Tip and Ring leads at point 14. While the unit is under power, the state of relay 38 is under microcontroller 26 software control. Microcontroller 26 is a general purpose programmable embedded microcontroller such as an Intel 8051 and includes the software stored in ROM. Microcontroller 26 has links to telephone loop detector 34, telephone answering device loop detector 96, ring detector 16, FSK decoder 28, DTMF transmitter 94, DTMF decoder 52, relay 38, pre-loading circuit 44, announcement circuit 30, LCD display 92, and name database 54. Name database 54 contains name records keyed to ICLID numbers. Database 54 is stored in non-volatile RAM or EEPROM accessed by microcontroller 26.

The telephone central office alerts the device to an incoming call by applying ring voltage to Tip and Ring leads at point 12. Ring detector 16 detects the ring voltage as it is applied by the telephone central office and indicates such to microcontroller 26.

FSK Decoder 28 detects frequency shift keyed (FSK) signals present at the Tip and Ring leads at point 12 (connected to the telephone central office). The FSK data contains the ICLID information transmitted from the telephone central office. The FSK data from the output of decoder 28 is presented to microcontroller 26. Exar's model XR-2211 is preferably used as decoder 28.

DTMF decoder 52 detects Dual Tone Multiple Frequency (DTMF) signals present at the Tip and Ring leads at point 14 (connected to the telephone sets). The DTMF signal data from the output of decoder 52 is presented to microcontroller 26. Mitel's model MT-8870 is preferably used as decoder 52.

DTMF transmitter 94 transmits Dual Tone Multiple Frequency (DTMF) signals onto the Tip and Ring leads at point 12 (connected to the telephone central office). The DTMF signal transmitted from the analog output of transmitter 94 is controlled by microcontroller 26, and is used for interacting with telephone company central office switching system protocols. Mitel's model MT-8888 is preferably used as transmitter 94.

Loop detector 34 detects the presence of loop current through the telephone set. The output of detector 34 is presented to microcontroller 26. Loop detector 96 detects the presence of loop current through an attached telephone answering device, such as an answering machine. The output of detector 96 is presented to microcontroller 26. Current source 40 supplies loop current for announcing the caller's identity over an off-hook telephone set attached at point 14. Current source 40 supplies loop current into relay 38 while relay 38 is energized.

Announcement circuit 30 supplies a small signal announcement into current source 40. Announcement circuit 30 is controlled by microcontroller 26. Texas Instruments' TSP50C10 or TSP3478 or Information Storage Devices' 2575 components are preferably used for announcement circuit 30.

Current source 40 provides an amplified announcement signal out speaker port 32 as well as into relay 38.

Loading circuit 44 is used to terminate the Tip and Ring leads at point 12 after the incoming call is accepted but before relay 38 has been de-energized. Circuit 44 absorbs the "pop" noise as DC current is drawn from the telephone office. Loading circuit 44 is also used to engage the telephone company central office loop circuit during the audible identification of Caller-ID with Call Waiting calls, and to implement the Call Waiting subscriber hook-flash protocol.

Figure 2:
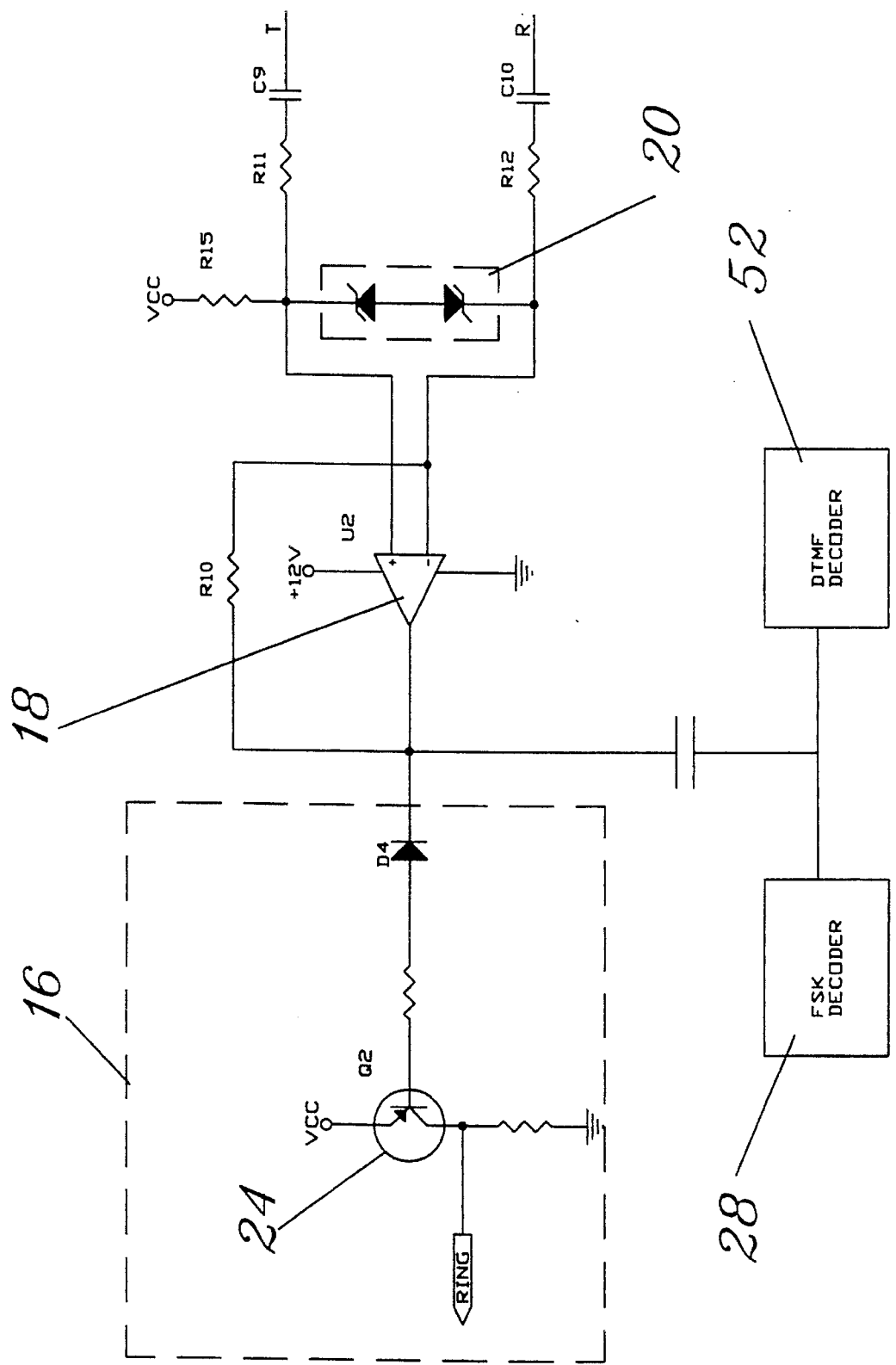
FIG. 2 is a schematic of the ring detection and signal extraction circuitry.

FIG. 2 illustrates ring detector 16 and operational amplifier 18. The output of amplifier 18 oscillates between the voltage rails in the presence of ringing, speech, or tone signaling. The nominal output of amplifier 18 is +5 VDC. Diodes 20 limit the differential voltage level into amplifier 18 and prevent destruction of amplifier 18 while ring voltage is applied by the telephone office. The output of amplifier 18 is conditioned to provide a TTL-compatible ring signal indication at the collector of transistor 24. The ring signal indication is connected to a parallel port pin of microcontroller 26.

Figure 3:
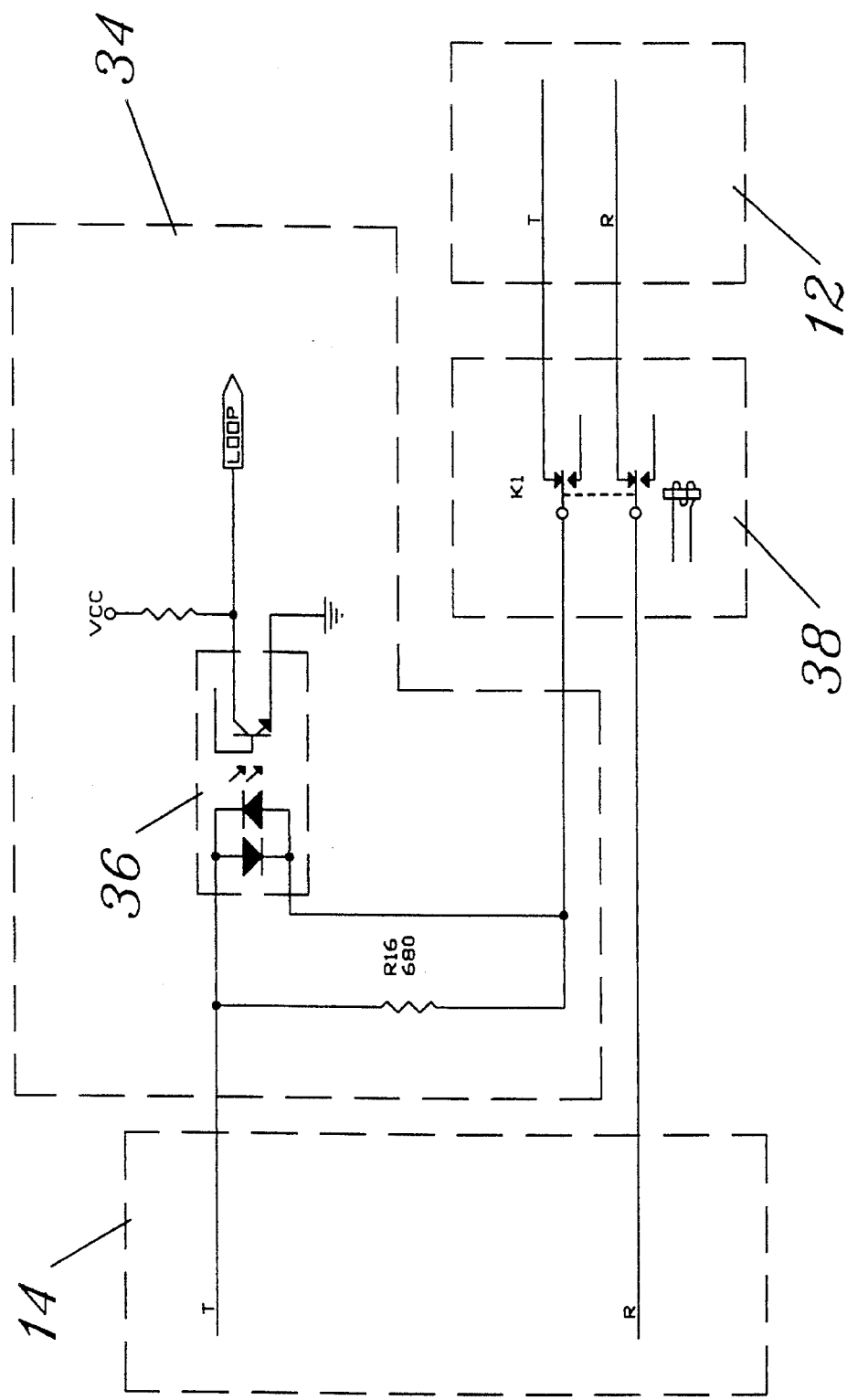
FIG. 3 is a schematic of the telephone loop (hook switch) detector.

The output of amplifier 18 also serves to provide a single ended analog signal to FSK decoder 28 corresponding to the differential voltages applied on the telephone line in the presence of ICLID or tone signaling respectively. The output of decoder 28 is the serial data equivalent of the ICLID signal and is read into microcontroller 26 through a serial input port. FIG. 3 illustrates the design of loop detector 34 and its placement with respect to telephones at point 14, the telephone office at point 12, and relay 38. Optoisolator 36 detects the presence of loop current established when an attached telephone set is taken off-hook at point 14. The output of optoisolator 36 is connected to a parallel port pin of microcontroller 26. Siemens model H 11AA1 is preferably used as optoisolator 36.

Figure 4:
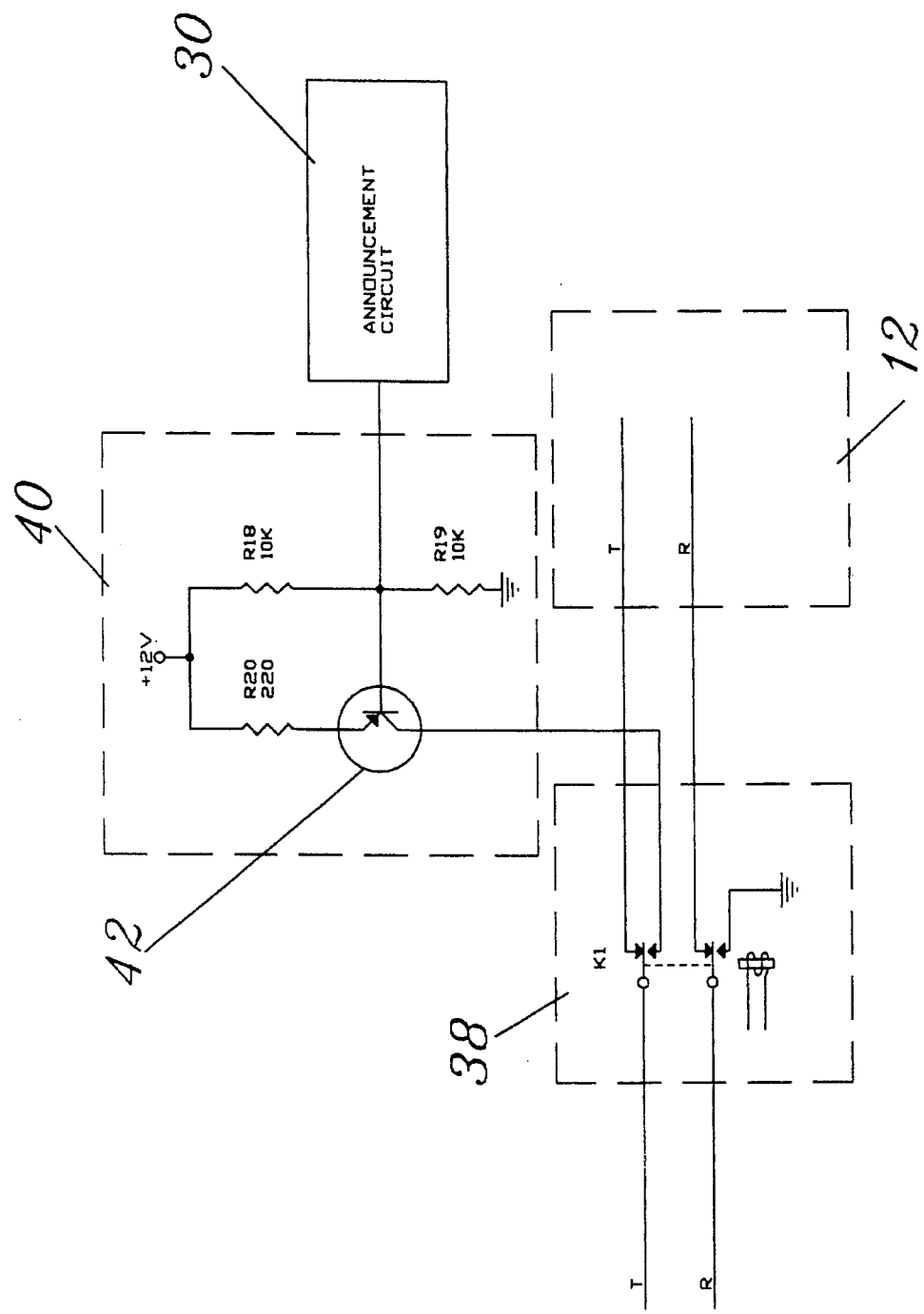
FIG. 4 is a schematic of the current source for providing power to the telephone sets while announcing the caller identity.

FIG. 4 illustrates current source circuit 40. Loop current is provided through the collector of transistor 42. Transistor 42 is biased at its base to provide a nominal DC current on the order of 20 mA. Announcement circuit 30 drives the base of transistor 42. The vocal announcement is amplified by transistor 42, travels through energized relay 38, through detector 34, and finally to off-hook telephones connected at point 12.

Figure 5:
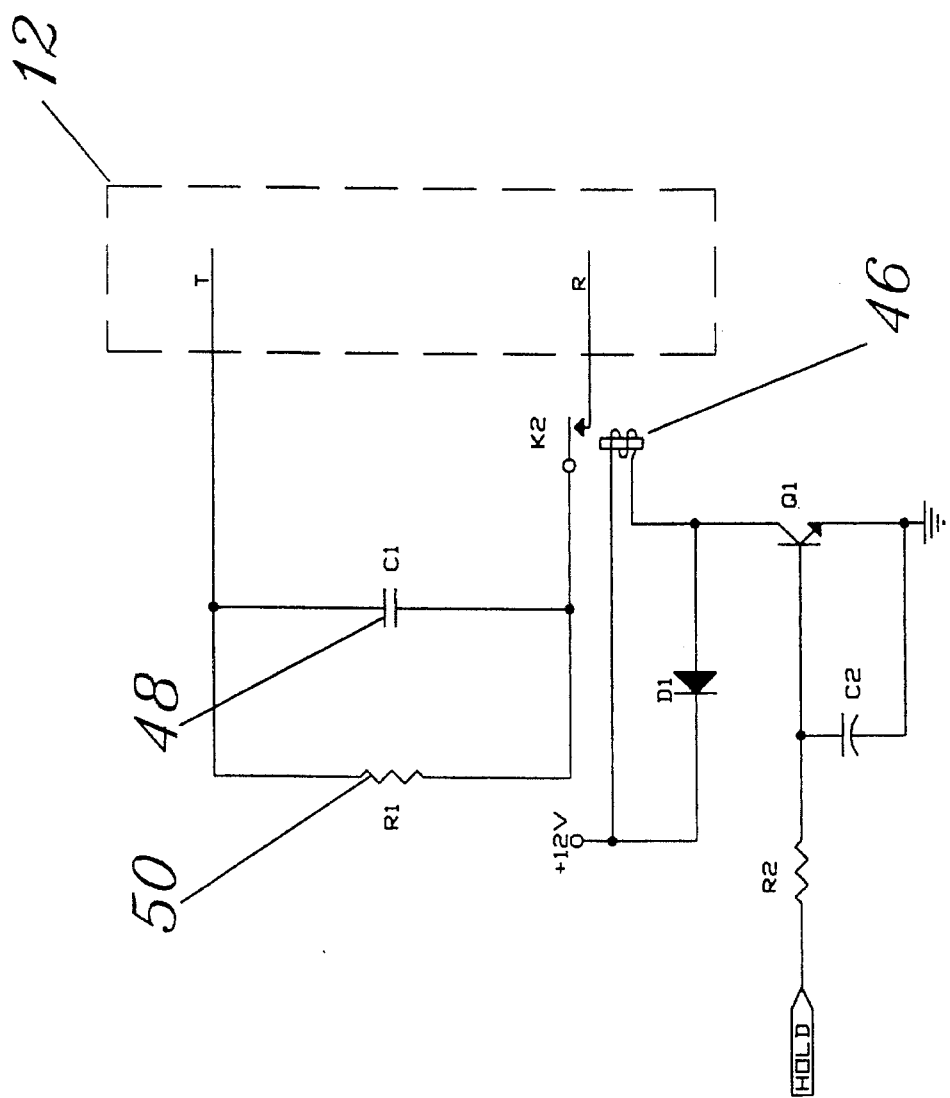
FIG. 5 is a schematic of the line pre-loading circuit used to stabilize the telephone line before delivering the call to the called party.

FIG. 5 illustrates trunk loading circuit 44. Circuit 44 consists of a single pole single throw relay 46 used to connect capacitor 48 and resistor 50 across the telephone line. As soon as the microcontroller 26 engages relay 46, loop current is drawn from the telephone office connected at point 12 and the telephone office ceases ringing the line and delivers the call. Approximately 500 ms after engaging relay 46, microcontroller 26 releases relay 38 which cuts the call over to the answered telephone. Relay 46 is released by the microcontroller 26 approximately 500 ms after releasing relay 38. For systems installed on premises served by Caller ID with Call Waiting, relay 46 is used in addition to hold the primary call stable while announcing the identity of the call waiting call over the telephone handset.

Figure 6:
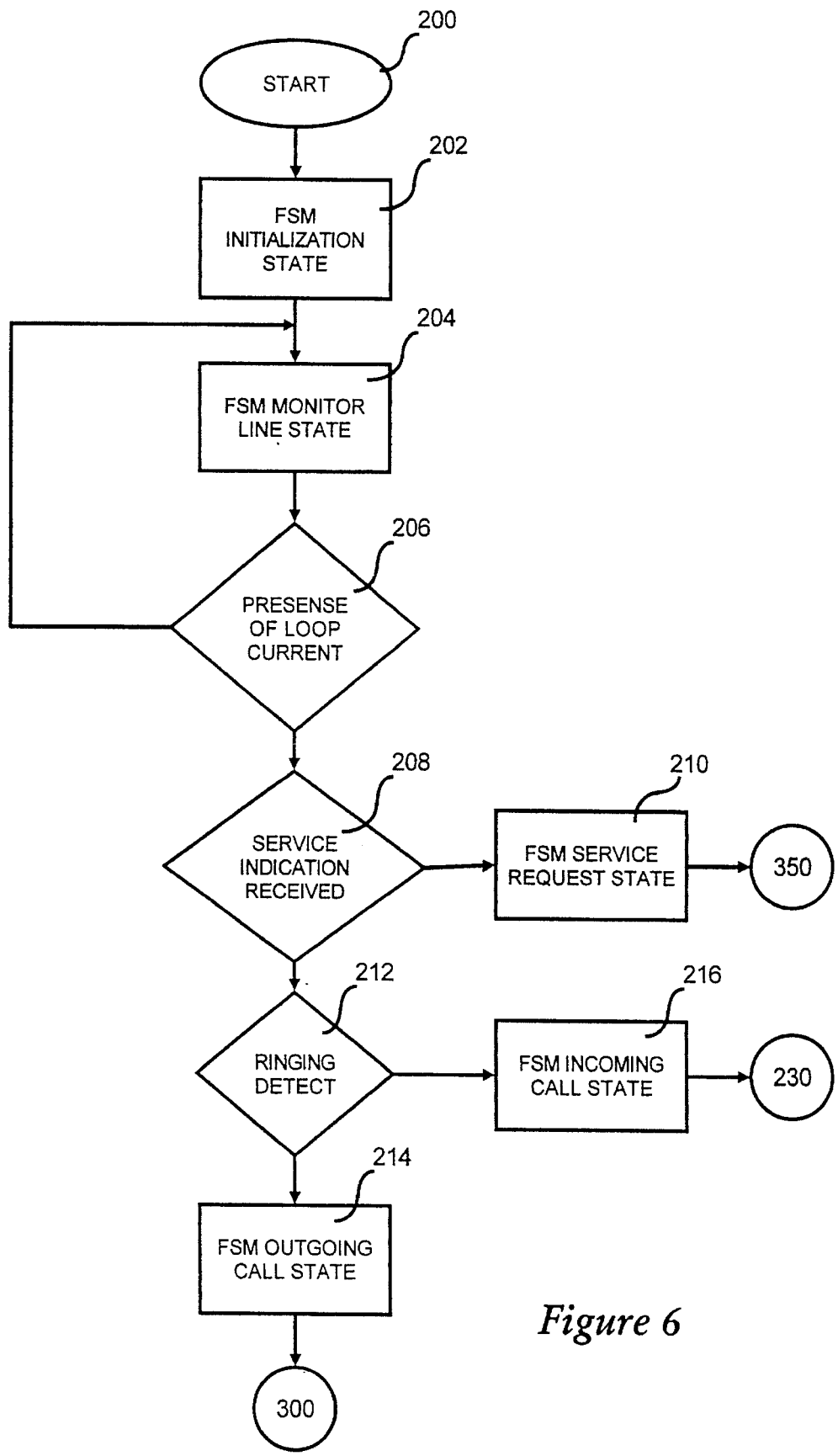
FIG. 6 is a flow chart showing the microcontroller processing software in the MAIN routine.

FIG. 6 illustrates the main software process executed by microcontroller 26. A Finite State Machine (FSM) process is used to control the invention. The primary states of the FSM are STARTUP, INITIALIZATION, MONITOR, SERVICE, INCOMING, and OUTGOING states.

Process 200 is a startup routine for the selected microcontroller 26 used to set up interrupt vectors, serial modes, and hardware configuration. Process 200 is entered following power-up or reset of the invention and sets the FSM to the STARTUP state. Process 202 is entered following the STARTUP, SERVICE, INCOMING, and OUTGOING states. Process 202 initializes specific hardware and software registers and the FSM to the INITIALIZATION state. Relays 38 and 46 are de-energized. Dynamic call records are initialized and elements about the last call are preserved in the LAST CALL register. The number of calls stored in a call log, along with the local time and date, is displayed on an attached LCD display 92. Execution continues to the MONITOR state at process 204. Process 204 monitors the status of the telephone line, specifically looking at the output of loop detector 34, ring detector 16, and DTMF decoder 52. Execution remains in the MONITOR state and proceeds to process 206. Process 206 checks the result of polling loop detector 34 and branches back to process 204 if no current is present or continues on at process 208 if current is present. Process 208 checks the result of polling the DTMF decoder 52. If a service indication signal, such as '#' or '*' tone, was received, execution branches to process 210 where the FSM transitions to SERVICE state and branches to process 350. Otherwise execution continues at process 212. Process 212 checks the result of polling ring detector 16. If ringing is detected, execution branches to process 216 where the FSM transitions to the INCOMING state and branches to process 230. Otherwise, execution continues at process 214 where the FSM transitions to the OUTGOING state and branches to process 300.

The software process uses a few hardware interrupts and software exceptions to force process branches or register accumulations. Loss of loop current reported by detector 34 while in the SERVICE or OUTGOING state will automatically cause a branch to process 202. Loss of loop current while in the INCOMING state beyond process 246 will automatically cause a branch to process 202. Loss of periodic ringing while in the INCOMING state before the call is accepted will automatically cause a branch to process 202. Ring cycles as determined by the state of ring detector 16 and timers are counted while in the INCOMING state. Caller ID with Call Waiting signals detected while in process 300 will cause a branch to process 230.

Figure 7:
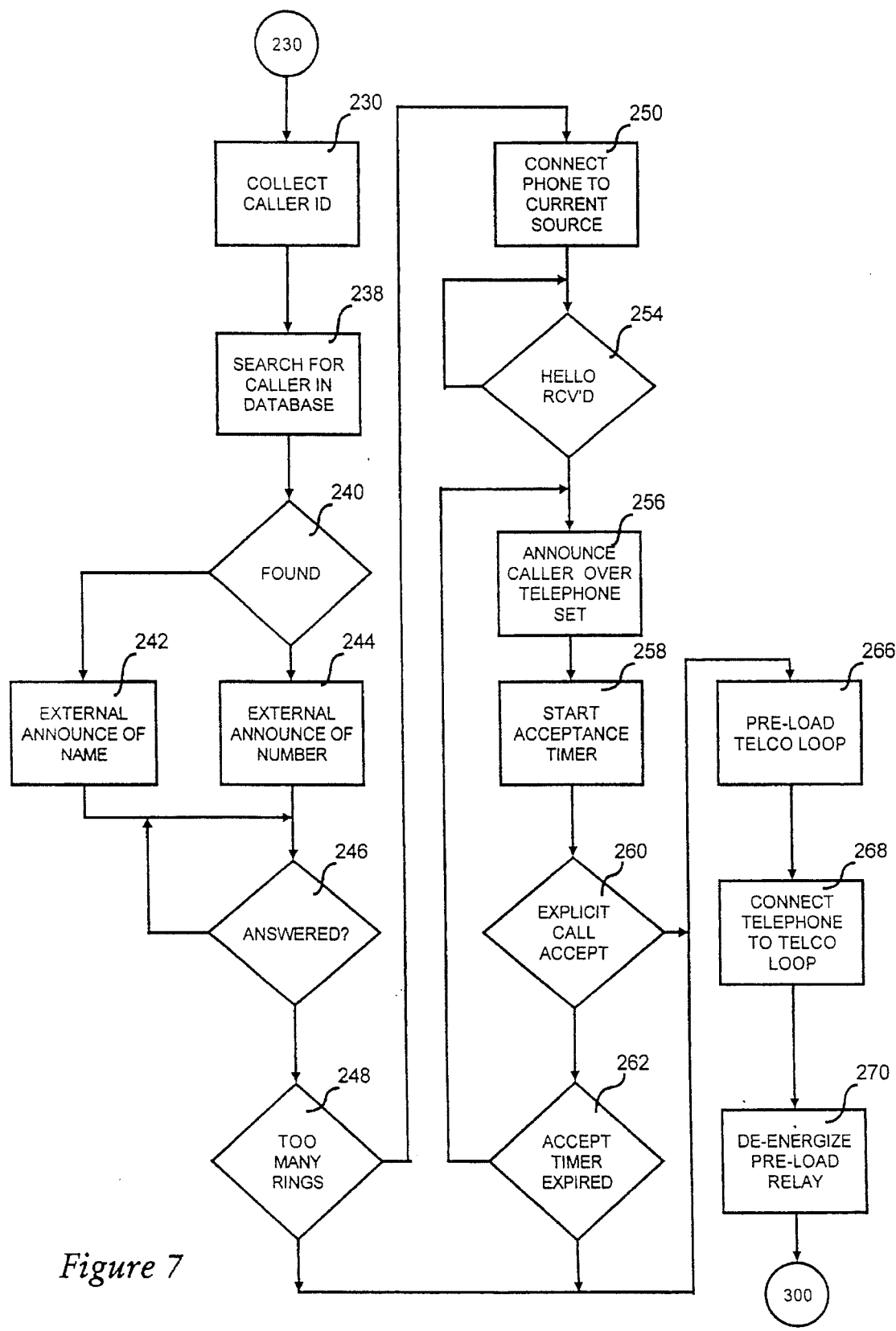
FIG. 7 is a flow chart showing the microcontroller processing software for handling INCOMING calls.

FIG. 7 illustrates the INCOMING state process. The process begins at 230 where the ICLID signal is collected over the microcontroller 26 serial port. Process 238 searches database 54 for a match to the collected ICLID number. Database 54 contains names associated with each ICLID number or a group of ICLID numbers. If the ICLID number is not provided by the telco, or the ICLID number is marked as unlisted, or the ICLID number is from outside the calling area, database 54 returns "unidentified caller" or "private caller" or "out of area" respectively. Process 240 branches based on the status of the search through database 54. If the search returned a zero value, execution branches to process 242 and microcontroller 26 directs announcement circuit 30 to speak the ICLID number, typically the caller's telephone number. Otherwise, execution branches to process 244 and microcontroller 26 directs announcement circuit 30 to speak the name returned from the search. Process 246 loops continuously monitoring loop detector 34 for an off-hook condition, displays the ICLID call data on display 92, and branches to process 248 once an off-hook is detected. Process 248 compares the number of ring cycles counted with the MAXRING value. If the number of cycles is less than MAXRING, execution continues at process 250. Otherwise, execution branches to process 266.

Process 250 causes microcontroller 26 to energize relay 38 cutting the telephone set away from the telephone office and connecting it to current source 30. Process 254 monitors detector 16 for the presence of energy generated by the called party speaking a greeting such as "Hello" into the off-hook telephone set. In the presence of energy, execution continues at process 256. Process 256 directs announcement circuit 30 to speak the caller's name or number over the off-hook telephone set. A timer is started at process 258 and will expire if the call is not accepted in a pre-set time period. Process 260 checks loop detector 34 and DTMF detector 52 for indication that the call has been accepted, such as by a hook-flash or tone. If the call is explicitly accepted, execution branches to process 266, otherwise it continues at process 262. If the acceptance timer has expired, execution branches back to process 256 to repeat the audible announcement over the telephone set. If after three repeat attempts, the call is implicitly accepted and execution continues at process 266.

At process 266, microcontroller 26 energizes relay 46 to engage the trunk preloading termination. Approximately 250 ms later, process 268 de-energizes relay 38 which connects the caller to the called party. Approximately 500 ms later, process 270 de-energizes relay 46. Execution branches to process 300.

Figure 8:
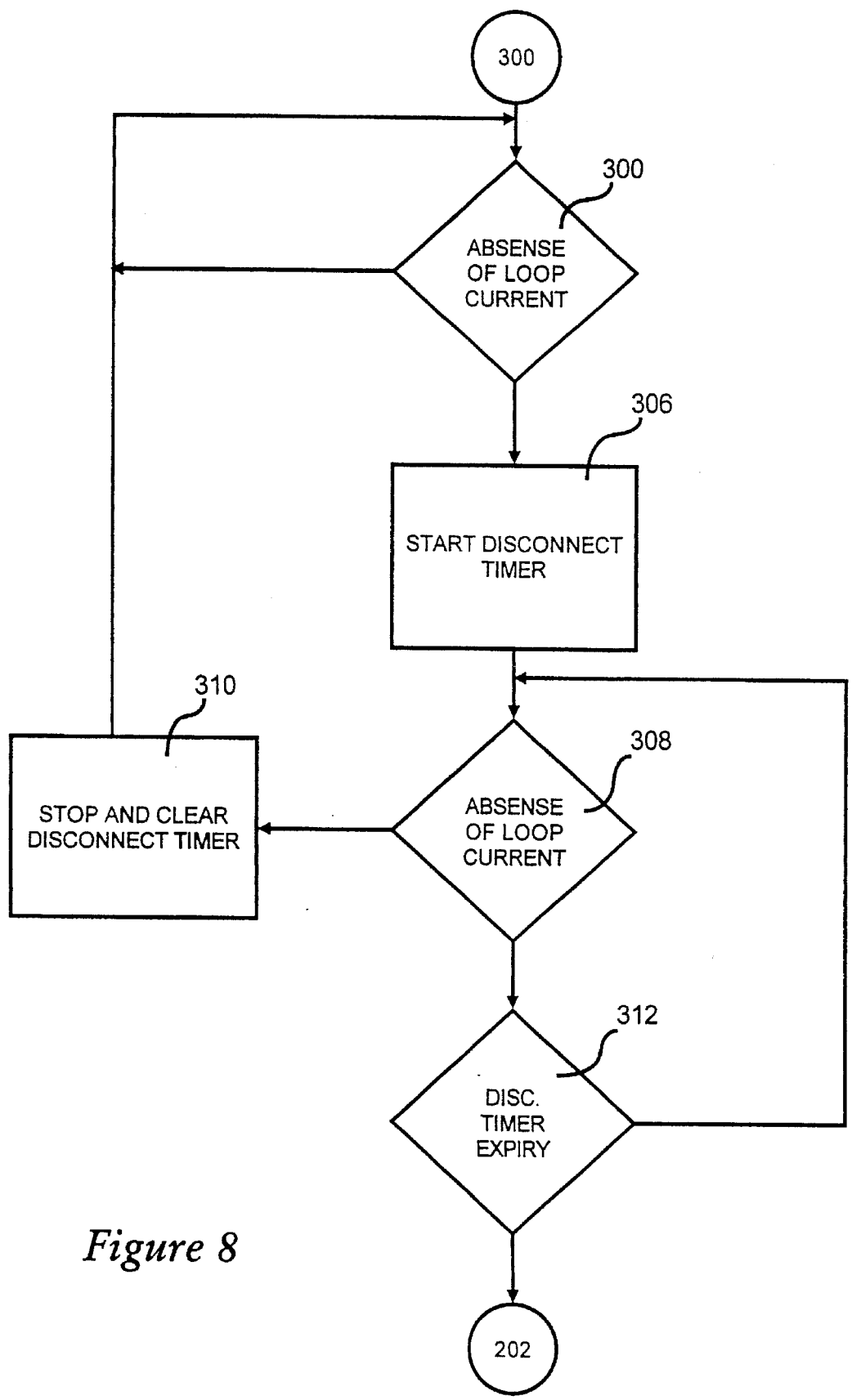
FIG. 8 is a flow chart showing the microcontroller processing software for handling OUTGOING calls.

FIG. 8 illustrates the OUTGOING state process. Process 300 manages all outgoing telephone calls and stable connected incoming calls. Process 300 samples the output of loop detector 34. In the absence of loop current, indicating a possible "hang up" condition, execution branches to process 306, otherwise execution loops at process 300. Process 306 starts a disconnect timer to measure the duration of the no-current condition. Process 308 samples the output of loop detector 34 again, and branches to process 312 if the no-current condition persists. If current has restored, execution branches to process 310, where the timer is cleared, and execution resumes back at process 300 again. Process 312 checks the status of the timer. If the timer has expired, the called party has disconnected, and execution returns to the INITIALIZATION state at process 202.

Process 300 may be interrupted by a Caller ID with Call Waiting event. Such an event occurs if the subscriber has Caller ID with Call Waiting (CIDCW) service, and a secondary call alerting signal is presented by the telephone company central office. In this event, loading circuit 44 is engaged to hold the primary call, while processing jumps to process 230, handling the secondary Call Waiting call as if it were an incoming call, and utilizes loading circuit 44 to implement the subscriber's call waiting hook-flash control sequence. The CIDCW service acknowledgment is implemented using DTMF transmitter 94 according to the Bellcore CIDCW service specification.

Figure 9:
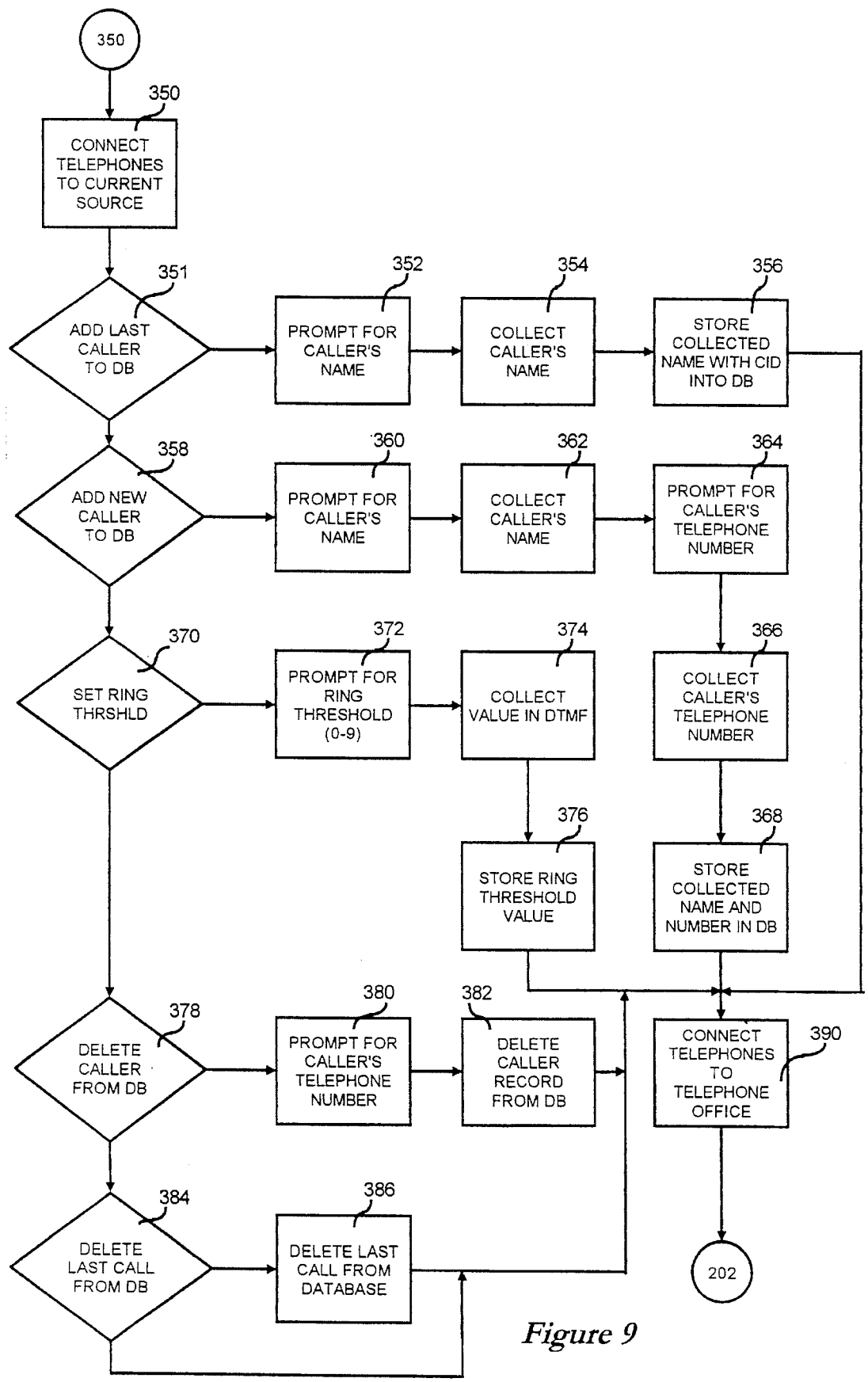
FIG. 9 is a flow chart showing the microcontroller processing software for special service requests, such as adding a caller to the name database.

FIG. 9 illustrates the SERVICE state process. The SERVICE processes are used to add or change records in name database 54 or customize the performance of the software.

Process 350 energizes relay 38 to connect the telephone set to current source 40.

Process 351 compares the received service indication code with the code to add information about the last caller into database 54. If the code matches, execution branches to process 352, otherwise execution continues at process 358. Process 352 directs announcement circuit 40 to prompt the subscriber to enter the name of the previous caller. Process 354 collects the name, or the key to a previously entered name, using DTMF decoder 52 or other various input means, such as a voice codec. Process 356 stores the name along with the ICLID number collected during the last call as a record in name database 54. A mechanism is provided to prevent database overflow by overwriting the least frequently used name records. Execution branches to process 390.

Process 358 compares the received service indication code with the code to add information about a new caller into database 54. If the code matches, execution branches to process 360, otherwise execution continues at process 370. Process 360 directs announcement circuit 40 to prompt the subscriber to enter the name of the new caller. Process 362 collects the name using DTMF decoder 52 or other various input means, such as a voice codec. Process 364 directs announcement circuit 40 to prompt the subscriber to enter the telephone number of the new caller. Process 366 collects the number using DTMF decoder 52. Process 368 stores the collected name along with the collected number as a record in name database 54. A mechanism is provided to prevent database overflow by overwriting the least frequently used name records. Execution branches to process 390.

Process 370 compares the received service indication code with the code to set the ring threshold MAXRING. If the code matches, execution branches to process 372, otherwise execution continues at process 378. Process 372 directs announcement circuit 40 to prompt the subscriber to enter the ring threshold value using DTMF digits 0 through 9. Process 374 collects the entered digit by sampling DTMF decoder 52. Process 376 stores the collected value in the MAXRING software register. Execution branches to process 390.

Process 378 compares the received service indication code with the code to delete a caller record from database 54. If the code matches, execution branches to process 380, otherwise execution continues at process 384. Process 380 directs announcement circuit 40 to prompt the subscriber for the telephone number of the caller. Process 382 collects the entered telephone number by sampling DTMF decoder 52 and removes the associated caller record from database 54. Execution branches to process 390.

Process 384 compares the received service indication code with the code to delete the last caller from database 54. If the code matches, execution branches to process 386, otherwise execution continues at process 390. Process 386 removes the caller record associated with the last caller from database 54. Execution branches to process 390.

Process 390 de-energizes relay 38 to restore the connection to the telephone office. Execution jumps back to the INITIALIZATION state at process 202.

Figure 10:
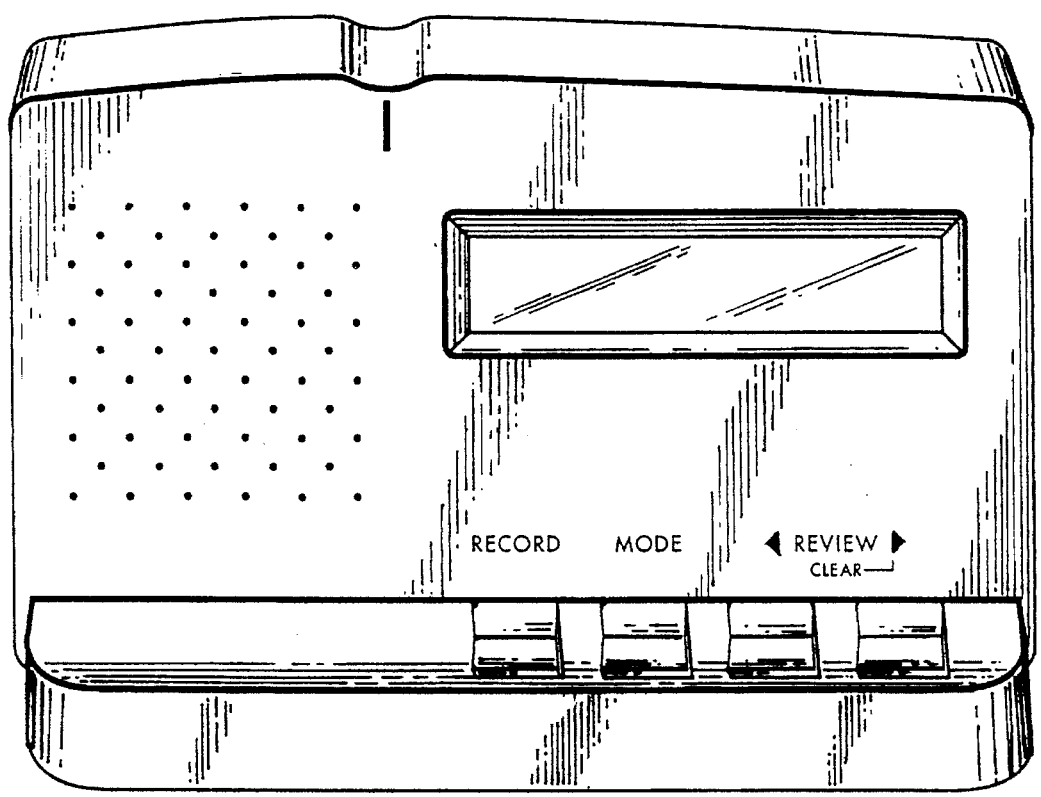
FIG. 10 illustrates the invention housed in its case as it will be attached to a telephone set.

FIG. 10 illustrates the invention housed in its case as it would be attached to the telephone set.

The above described example utilizes the invention attached to a single telephone set, however, the same apparatus may be used to provide audible Caller ID delivery over all telephone sets sharing the same telephone line.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A calling party announcement apparatus for a telephone set where said telephone set is connected to a telephone system which provides a caller identification signal to said telephone set when connected to said telephone system, said apparatus, being located at a called party's location, comprising:

identification detecting means, connected between said telephone set and said telephone system for detecting said caller identification signal;

ring detecting means, for detecting a ring voltage provided by said telephone system to ring said telephone set, to indicate an incoming call to said telephone set;

central processing means, connected to said identification detecting means and said ring detecting means, for processing said caller identification signal to output a signal corresponding to the identity of the calling party and to output a ring signal corresponding to said ring detecting means;

isolation means, interconnected with said central processing means, for isolating said telephone set from said telephone system, in response to said ring signal, during the time following a first ring to said telephone set from said telephone system until the time after the first ring but before said telephone system recognizes said telephone set has been answered, where said telephone system is unaware that said telephone set has been answered and continues to return a ringback indicator to the calling party;

loop current means, connected to said central processing means, and connected to said announcing means, for powering said telephone set during the time said isolation means is activated;

announcing means, connected to said central processing means, for transforming the identity signal provided by said central processing means to produce an audible signal that announces the calling party's identity through a speaker of said apparatus or said telephone set.

2. The calling party announcement apparatus of claim 1 further comprising:

reconnection means, interconnected with said central processing means, for reconnecting said telephone set to said telephone system after the called party has decided to accept said incoming call.

3. The calling party announcement apparatus of claim 2 further comprising speech synthesizing means for providing the caller's telephone number in synthesized human speech.

4. The calling party announcement apparatus of claim 3 wherein said central processing means further comprises memory storage for providing a signal to said announcement means that corresponds to the name of the calling party.

5. The calling party announcement apparatus of claim 4 wherein said memory storage means further comprises address input means for adding, deleting, and editing names and corresponding telephone numbers.

6. The calling party announcement apparatus of claim 4 wherein said memory storage means further comprises multiple association means for associating a single name with multiple corresponding telephone numbers.

7. A method of announcing an identity of a calling party to a called party being performed by an apparatus, connected to a telephone set of said called party and a telephone system and located at the called party's location, comprising the steps of:

detecting a caller's line identification signal provided by said telephone system to said called party's telephone set;

detecting a ring voltage provided by said telephone system to ring said telephone set and outputting a corresponding ring signal;

isolating said called party's telephone set from said telephone system, in response to said ring signal, during the time following a first ring to said telephone set from said telephone system until the time after the first ring but before said telephone system recognizes said telephone set has been answered, where said telephone system is unaware that said telephone set has been answered and continues to return a ringback indicator to the calling party;

powering said called party's telephone set with a local loop current;

processing the signal detected corresponding to the caller's line identification signal to a signal corresponding to the identity of the calling party;

producing an audible signal that announces the identity of the calling party, to the called party, through a speaker of said apparatus or said telephone set; and reconnecting the called party's telephone set to said telephone system if the called party elects to accept the call from the calling party.

8. The calling party announcement apparatus of claim 6 wherein said apparatus is a component of said telephone set.

9. The calling party announcement apparatus of claim 6 wherein said apparatus is a component of a cordless telephone set.

10. The calling party announcement apparatus of claim 6 wherein said apparatus is a component of a computer modem.

11. The calling party announcement apparatus of claim 6 wherein said apparatus is a component of a computer-telephony interface board.

12. The calling party announcement apparatus of claim 6 wherein said apparatus is a component of a telephone answering device.

13. The calling party announcement apparatus of claim 6 wherein said apparatus is interconnected to a plurality of telephone sets served by the same telephone line of said telephone system.

14. The calling party announcement method of claim 7 wherein said apparatus is a component of said telephone set.

15. The calling party announcement method of claim 7 wherein said apparatus is a component of a cordless telephone set.

16. The calling party announcement method of claim 7 wherein said apparatus is a component of a computer-telephony interface board.

17. The calling party announcement method of claim 7 wherein said apparatus is a component of a telephone answering device.

18. The calling party announcement method of claim 7 wherein said apparatus is interconnected to a plurality of telephone sets served by the same telephone line of said telephone system.

19. The calling party announcement apparatus of claim 7 wherein said apparatus are components of a computer modem.

* * * * *